W. E. GUNN.
HARVESTING TOOL OR IMPLEMENT.
APPLICATION FILED JULY 30, 1914.
1,133,021.
Patented Mar. 23, 1915.
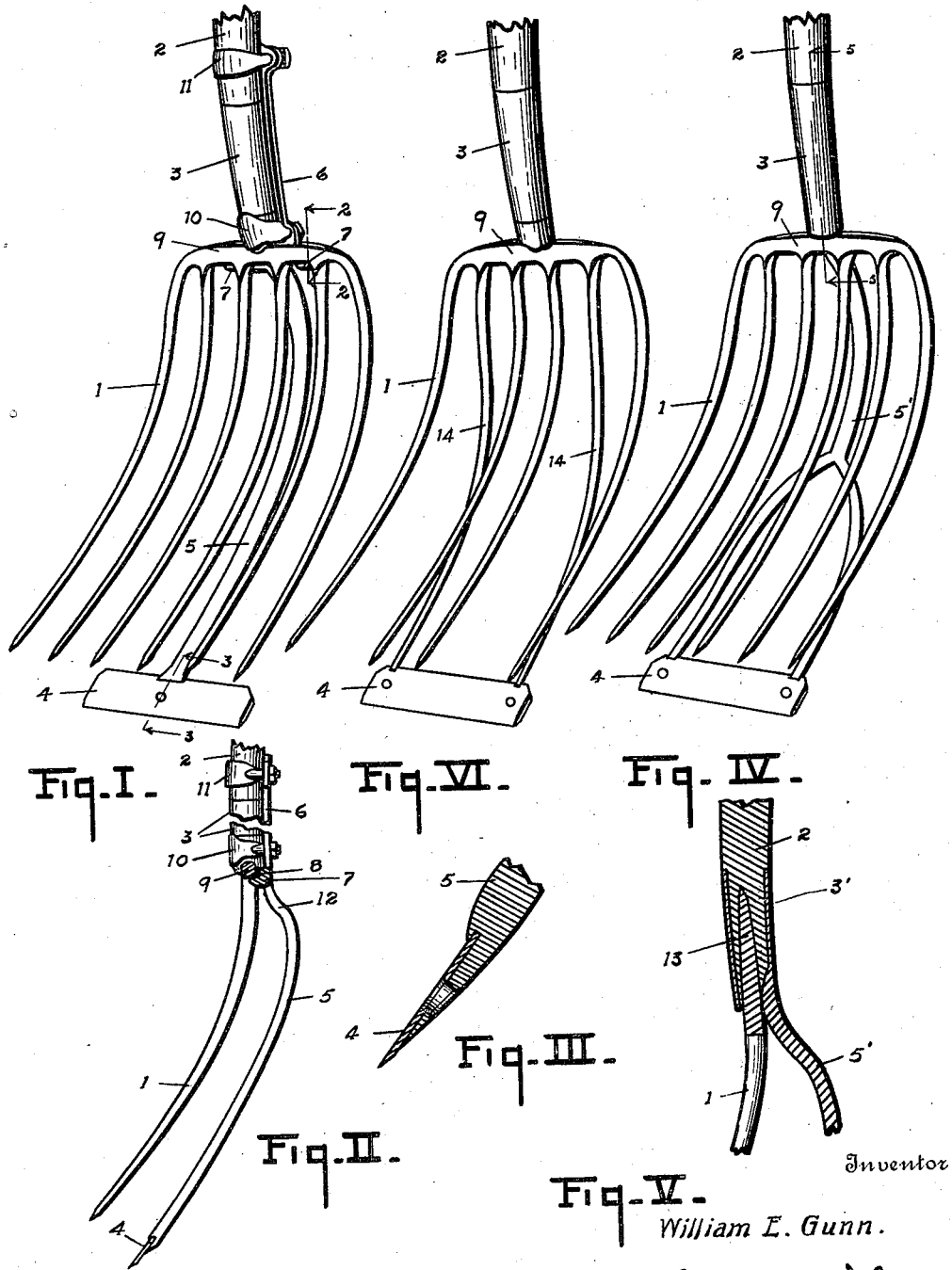

UNITED STATES PATENT OFFICE.

WILLIAM E. GUNN, OF FERRY, MICHIGAN.

HARVESTING TOOL OR IMPLEMENT.

1,133,021.     Specification of Letters Patent.     Patented Mar. 23, 1915.

Application filed July 30, 1914. Serial No. 854,039.

*To all whom it may concern:*

Be it known that I, WILLIAM E. GUNN, a citizen of the United States, residing at Ferry, Oceana county, Michigan, have invented certain new and useful Improvements in Harvesting Tools or Implements, of which the following is a specification.

This invention relates to improvements in harvesting tools or implements.

My improved harvesting tool or implement is especially designed by me as a tool for harvesting beans, peas and the like by hand and I have shown my improvements in the accompanying drawings as I have embodied them for that purpose.

The main objects of this invention are: First, to provide an improved harvesting tool or implement for harvesting beans, peas and the like which is an adaptation of a common type of fork to the purpose. Second, to provide an improved tool or implement of the class described which enables the rapid and easy harvesting by hand of crops such as beans, peas and the like.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a front perspective view of a device embodying the features of my invention, the handle being broken away. Fig. II is a detail section on a line corresponding to line 2—2 of Fig. I. Fig. III is an enlarged detail section through the cutting blade on a line corresponding to line 3—3 of Fig. I. Fig. IV is a detail front perspective view of a modified form of my invention, the modification being in the form of the blade supporting arm and the manner of securing it to the handle. Fig. V is a detail section on a line corresponding to line 5—5 of Fig. IV. Fig. VI is a detail front perspective of a still further modification in which two of the tines of the fork are modified or adapted to constitute blade supporting arms.

In the drawing similar reference characters refer to similar parts throughout the several views, and the sectional views are taken looking in the direction of the little arrows at the ends of the section lines.

Referring to the drawing, the fork 1 illustrated is a six tine fork of well known form. The handle 2 is provided with a ferrule 3 as is common practice. A cutting blade 4 is disposed below and in a spaced relation to the ends of the tines. This cutting blade is carried by an arm 5, which is disposed below and in a spaced relation to the tines. In the structure shown in Figs. I and II the arm 5 is provided with a T-shaped clamp member 6 at its upper end disposed on the under side of the handle, the cross portion 7 of the clamp member being shouldered at 8 to embrace the under side and engage the head 9 of the fork. The clip 10 is disposed to embrace the ferrule 3 close to the head of the fork and the clip 11 to embrace the handle 2 above the ferrule. Thus arranged the clamp serves to reinforce the handle and the fork is also provided with an additional support so that the parts effectively withstand the strains to which they are subjected in use.

The central pair of tines in the fork illustrated are disposed so that there is a space between in alinement with the handle. The arm 5 is centrally disposed below this space.

The arm 5 is offset downwardly at 12 adjacent the head of the fork so that the body portion of the arm is substantially parallel with the tines. This arrangement renders clogging between the tines and the blade and the tines and arm quite unlikely.

In use the implement is pushed forward in a manner similar to a shuffle hoe with the blade 4 under the ground severing the plants as the tool is pushed along the row. The tops fall upon and are gathered by the tines of the fork so that they may be thrown into piles or rows or directly upon a wagon. The tines are supported so that they move along above the ground as the implement is pushed along the row so that very little dirt is gathered thereby.

In the modified structure shown in Figs. IV and V the arm 5' is formed with or welded to the ferrule 3', the fork 1 being provided with a shank 13 which is driven into the end of the handle, as shown in Fig. V. The arm 5 is forked or bifurcated, the ends of the blade being riveted to the arms of the fork.

In the modification shown in Fig. VI the blade supporting arms 14 are formed from tines of the fork, the tines being bent down to support the blade in its proper spaced relation to the tines of the fork. The structure shown in Fig. I however, is preferred by me as many forks now in use may be used.

My improved harvesting implement is comparatively easy and convenient to use and greatly facilitates the harvesting of crops such as beans. It is obvious that it may be used for other purposes.

I have illustrated and described my improvements in the form preferred by me and certain modifications thereof. Other modifications will no doubt suggest themselves to those skilled in the art to which this invention relates. I desire to be understood as claiming my improvements specifically in the form illustrated as well as broadly within the scope of the appended claims.

Having thus described my invention, what I claim as new and desire to secure by Letters Patent, is:

1. In a hand implement, the combination of a fork provided with a handle having a ferrule, a narrow cutting blade disposed below the ends of the tines in a spaced relation thereto, a blade supporting arm disposed below and in a spaced relation to the tines, a T-shaped clamp member for said arm disposed below said ferrule, the cross portion of the clamp member being shouldered to engage the under side of the head of the fork, said arm being offset downwardly from the said clamp member and constituting a shoe for the implement, and a pair of clips for said clamp member, one of the clips being disposed to embrace said ferrule close to the head of the fork and the other the handle above the ferrule.

2. In a hand implement, the combination of a fork provided with a handle, a narrow cutting blade disposed below the ends of the tines in a spaced relation thereto, a blade supporting arm disposed below and in a spaced relation to the tines, and an attaching member for said arm disposed below said handle and shouldered to engage the under side of the head of the fork, said arm being offset downwardly from the said clamp member.

3. In a hand implement, the combination of a fork provided with a handle, a cutting blade disposed below the tines and in a spaced relation thereto, a blade supporting arm disposed below and in a spaced relation to the tines, and a clamp for detachably securing said arm to said handle.

4. In a hand implement, the combination of a fork, a handle, the tines of the fork being disposed so that there is a central space alined with the handle between the inner pair of tines, a cutting blade disposed below the ends of the tines and in a spaced relation thereto, and a blade supporting arm disposed below said central space and in a spaced relation to the tines and substantially parallel therewith, said arm being rigidly connected to the handle.

5. In a hand implement, the combination of a fork, a handle, a cutting blade disposed below the tines and in a spaced relation thereto, and a blade supporting arm disposed below and in a spaced relation to the tines and substantially parallel therewith, said arm being rigidly connected to the handle.

6. In a hand implement, the combination of a fork, a handle, and a cutting blade disposed in a plane below the plane of the tines of said fork when the tines are in an approximately horizontal position, the blade being spaced from the tines.

7. In a hand implement, the combination of a fork, a handle, and a cutting blade disposed in a spaced relation to and in the rear of the tines of said fork, all coacting for the purpose specified.

In witness whereof, I have hereunto set my hand and seal in the presence of two witnesses.

WILLIAM E. GUNN. [L. s.]

Witnesses:
E. L. BENTON,
MAUD BAUN.

Copies of this patent may be obtained for five cents each, by addressing the "Commissioner of Patents, Washington, D. C."